US007679795B2

(12) United States Patent
Oki

(10) Patent No.: US 7,679,795 B2
(45) Date of Patent: Mar. 16, 2010

(54) IMAGE PROCESSING APPARATUS AND METHOD THEREOF

(75) Inventor: Joji Oki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 794 days.

(21) Appl. No.: 11/147,180

(22) Filed: Jun. 8, 2005

(65) Prior Publication Data

US 2005/0275856 A1 Dec. 15, 2005

(30) Foreign Application Priority Data

Jun. 10, 2004 (JP) ............................. 2004-173005

(51) Int. Cl.
*G03F 3/08* (2006.01)
(52) U.S. Cl. ..................... 358/518; 358/1.9; 358/520; 382/162; 382/167; 715/274
(58) Field of Classification Search ................. 358/1.9, 358/518, 3.24, 520; 382/162, 167
See application file for complete search history.

(56) References Cited

U.S. PATENT DOCUMENTS

| 4,362,383 | A | * | 12/1982 | Yonehara et al. ............... 355/71 |
| 4,882,622 | A | * | 11/1989 | Uzuda et al. ................. 358/538 |
| 4,887,150 | A | * | 12/1989 | Chiba et al. .................. 358/523 |
| 6,137,595 | A | * | 10/2000 | Sakuyama et al. ............ 358/1.9 |
| 6,266,152 | B1 | * | 7/2001 | Nakajima .................... 358/1.9 |
| 6,344,908 | B1 | * | 2/2002 | Aritomi ...................... 358/529 |
| 6,348,977 | B1 | | 2/2002 | Ooki .......................... 358/1.9 |
| 6,449,829 | B1 | * | 9/2002 | Shafer ........................ 29/602.1 |
| 6,456,298 | B1 | * | 9/2002 | Kunimasa et al. ............ 345/629 |
| 6,559,982 | B1 | * | 5/2003 | Gondek ...................... 358/518 |
| 6,608,927 | B2 | * | 8/2003 | Ohta .......................... 382/167 |
| 7,298,522 | B2 | * | 11/2007 | Sugimoto ................... 358/1.3 |
| 2004/0080798 | A1 | * | 4/2004 | Nishide et al. .............. 358/518 |
| 2004/0239966 | A1 | * | 12/2004 | Larson ....................... 358/1.9 |
| 2005/0275854 | A1 | * | 12/2005 | Bailey ........................ 358/1.9 |

FOREIGN PATENT DOCUMENTS

| EP | 292212 A2 | * | 11/1988 |
| EP | 868074 A1 | * | 9/1998 |
| JP | 09-277606 | | 10/1997 |
| WO | WO 9858493 A1 | * | 12/1998 |

* cited by examiner

*Primary Examiner*—Mark K Zimmerman
*Assistant Examiner*—Miya J Cato
(74) *Attorney, Agent, or Firm*—Fitzpatrick, Cella, Harper & Scinto

(57) ABSTRACT

There are provided an image processing apparatus and method thereof which, in a case where drawing data represented by an RGB space satisfies a predetermined condition, perform a compensation of color that converts a pixel value of image data in an MCYK color space into a predetermined value, and in accordance with information for designating whether or not to use color conversion for each respective object included in the drawing commands, select whether to perform normal conversion processing for converting the drawing data of the RGB color space into a pixel value in the MCYK space or to perform color compensation conversion processing, and convert the pixel data from RGB to MCYK.

2 Claims, 12 Drawing Sheets

FIG. 3A

Object 1
ATTRIBUTE = CHARACTER, COLOR ATTRIBUTE = K, PRINT POSITION (x,y), FONT NAME, SIZE,
CHARACTER CODE = (A,B,C), COLOR = BLACK(255,255,255)

Object 2
ATTRIBUTE = GRAPHIC, COLOR ATTRIBUTE = K, PRINT POSITION (x,y), SHAPE = CIRCLE, RADIUS, COLOR = RED(255,0,0)

Object 3
ATTRIBUTE = IMAGE, COLOR ATTRIBUTE = YMCK, PRINT POSITION (x,y), width, height, matrix, pointer

FIG. 5

SETTINGS FOR CHARACTER

| SET COMPENSATION OF K | SET COMPENSATION OF C | SET COMPENSATION OF M | SET COMPENSATION OF Y | SET COMPENSATION OF CM | SET COMPENSATION OF MY | SET COMPENSATION OF CY |
|---|---|---|---|---|---|---|
| ● AUTOMATIC<br>○ ON<br>○ OFF | ● AUTOMATIC<br>○ ON<br>○ OFF | ● AUTOMATIC<br>○ ON<br>○ OFF | ● AUTOMATIC<br>○ ON<br>○ OFF | ● AUTOMATIC<br>○ ON<br>○ OFF | ● AUTOMATIC<br>○ ON<br>○ OFF | ● AUTOMATIC<br>○ ON<br>○ OFF |

SETTINGS FOR GRAPHIC

| SET COMPENSATION OF K | SET COMPENSATION OF C | SET COMPENSATION OF M | SET COMPENSATION OF Y | SET COMPENSATION OF CM | SET COMPENSATION OF MY | SET COMPENSATION OF CY |
|---|---|---|---|---|---|---|
| ● AUTOMATIC<br>○ ON<br>○ OFF | ● AUTOMATIC<br>○ ON<br>○ OFF | ● AUTOMATIC<br>○ ON<br>○ OFF | ● AUTOMATIC<br>○ ON<br>○ OFF | ● AUTOMATIC<br>○ ON<br>○ OFF | ● AUTOMATIC<br>○ ON<br>○ OFF | ● AUTOMATIC<br>○ ON<br>○ OFF |

SETTINGS FOR IMAGE

| SET COMPENSATION OF K | SET COMPENSATION OF C | SET COMPENSATION OF M | SET COMPENSATION OF Y | SET COMPENSATION OF CM | SET COMPENSATION OF MY | SET COMPENSATION OF CY |
|---|---|---|---|---|---|---|
| ● AUTOMATIC<br>○ ON<br>○ OFF | ● AUTOMATIC<br>○ ON<br>○ OFF | ● AUTOMATIC<br>○ ON<br>○ OFF | ● AUTOMATIC<br>○ ON<br>○ OFF | ● AUTOMATIC<br>○ ON<br>○ OFF | ● AUTOMATIC<br>○ ON<br>○ OFF | ● AUTOMATIC<br>○ ON<br>○ OFF |

IMAGE PROCESSING APPARATUS AND METHOD THEREOF

FIELD OF THE INVENTION

The present invention relates to an image processing apparatus that inputs drawing commands of a first color space to convert into image data of a second color space, and a method thereof.

BACKGROUND OF THE INVENTION

An image processing apparatus is known that inputs drawing commands specified with an RGB color space to generate bitmap data of a color space of C (cyan), M (magenta), Y (yellow) and K (black) in order to reproduce colors corresponding to the drawing commands in a printer or the like. In this type of apparatus, when instructed to perform compensation of gray according to the type of object, for example, characters, graphics or images of the drawing commands, if R (red)=G (green)=B (blue) in the RGB data of a pixel, then the color of the pixel is judged to be an achromatic color and that RGB data is converted to K (black) data (Y=M=C=0).

Further, in an image processing apparatus that enters drawing commands specified with a CMYK color space to generate color bitmap data for a CMYK color space of a device, when in an input pixel value of a CMYK color space, a value of cyan is equal to a value of magenta and yellow (C=M=Y), the color of the input pixel is taken as an achromatic color and a compensation of monochrome K is performed (see Japanese Patent Laid-Open No. 09-277606).

Thus, conventionally the compensation of a single color has been limited to black only, and it was not possible to compensate another single color, for example, each of the coloring materials of C, M and Y. Furthermore, for secondary colors (realized using a plurality of coloring materials, for example, green (G) obtained by a mixture of cyan (©) and yellow (Y)) also, such color compensation could not be effected.

SUMMARY OF THE INVENTION

An object of this invention is to solve the above-described problems of the conventional art.

A feature of this invention is to provide with an image processing apparatus that can select a color conversion method corresponding with a drawing object to convert into image data, and a method thereof.

A further feature of this invention is to provide with an image processing apparatus that, in a case where drawing data represented by a first color space satisfies a predetermined condition, converts the drawing data of the first color space into image data of the second color space by setting whether or not to convert a pixel value of image data of the corresponding second color space into a predetermined value for each drawing object included in the drawing commands, and a method thereof.

According to an aspect of the present invention, there is provided with an image processing apparatus for inputting drawing commands of a first color space and converting into image data of a second color space, the apparatus comprising:

first conversion means for converting drawing data of the drawing commands of the first color space into a pixel value of image data of the second color space;

second conversion means, in a case where the drawing data of the drawing commands of the first color space satisfies with a predetermined condition, for converting the pixel value of the second color space into a predetermined value including a single color or two colors; and control means for selecting either the first conversion means or the second conversion means in accordance with information for designating whether or not to use the second conversion means in correspondence with a drawing object included in the drawing commands, and controlling to convert the drawing data of the drawing commands of the first color space into the pixel values of image data of the second color space.

According to another aspect of the present invention, there is provided with an image processing method of inputting drawing commands of a first color space to covert into image data of a second color space, the method comprising:

a first conversion step of converting drawing data of the drawing commands of the first color space into a pixel value of image data in the second color space;

a second conversion step of converting the pixel value of image data of the second color space into a predetermined value including a single color or two colors, in a case where the drawing data of the drawing commands of the first color space satisfies a predetermined condition; and a control step of selecting either the first conversion step or the second conversion step in accordance with information for designating whether or not to use the second conversion step in correspondence with a drawing object included in the drawing commands, and controlling to convert the drawing data of the drawing commands of the first color space into the pixel value of image data of the second color space.

The above features are achieved by combining features set forth in the independent claims, and the dependent claims simply define advantageous concrete examples of the invention.

In this connection, the summary of this invention does not enumerate all the necessary features of the invention, and hence the scope of this invention also includes sub-combinations of these characterizing groups.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

FIGS. 3A and 3B depict views illustrating an example of intermediate data stored in an intermediate buffer of the embodiment, and an example of bitmap data generated by a renderer of the embodiment;

FIG. 5 depicts a view describing the setting of various parameters that are set separately for each type of object (character, graphic or image) of the embodiment;

DETAILED DESCRIPTION OF THE PREFERRED EMBODIMENTS

Preferred embodiments of the present invention will now be described in detail in accordance with the accompanying drawings. Note that the following embodiments do not limit the invention recited in the claims. Further, all combinations of features described in the embodiments are not essential to the solution presented by the present invention.

Before describing the configuration of the embodiment in detail, the configuration of an LBP to which the embodiment is applied will be described referring to FIG. 1 and FIG. 2. Although the embodiment is described taking as an example the control of a laser beam printer, this invention is not limited thereto, and the invention may also be applied to processing in an information processing apparatus such as a personal computer (PC) that outputs print data to a printer diver or a printer.

Figure 1:
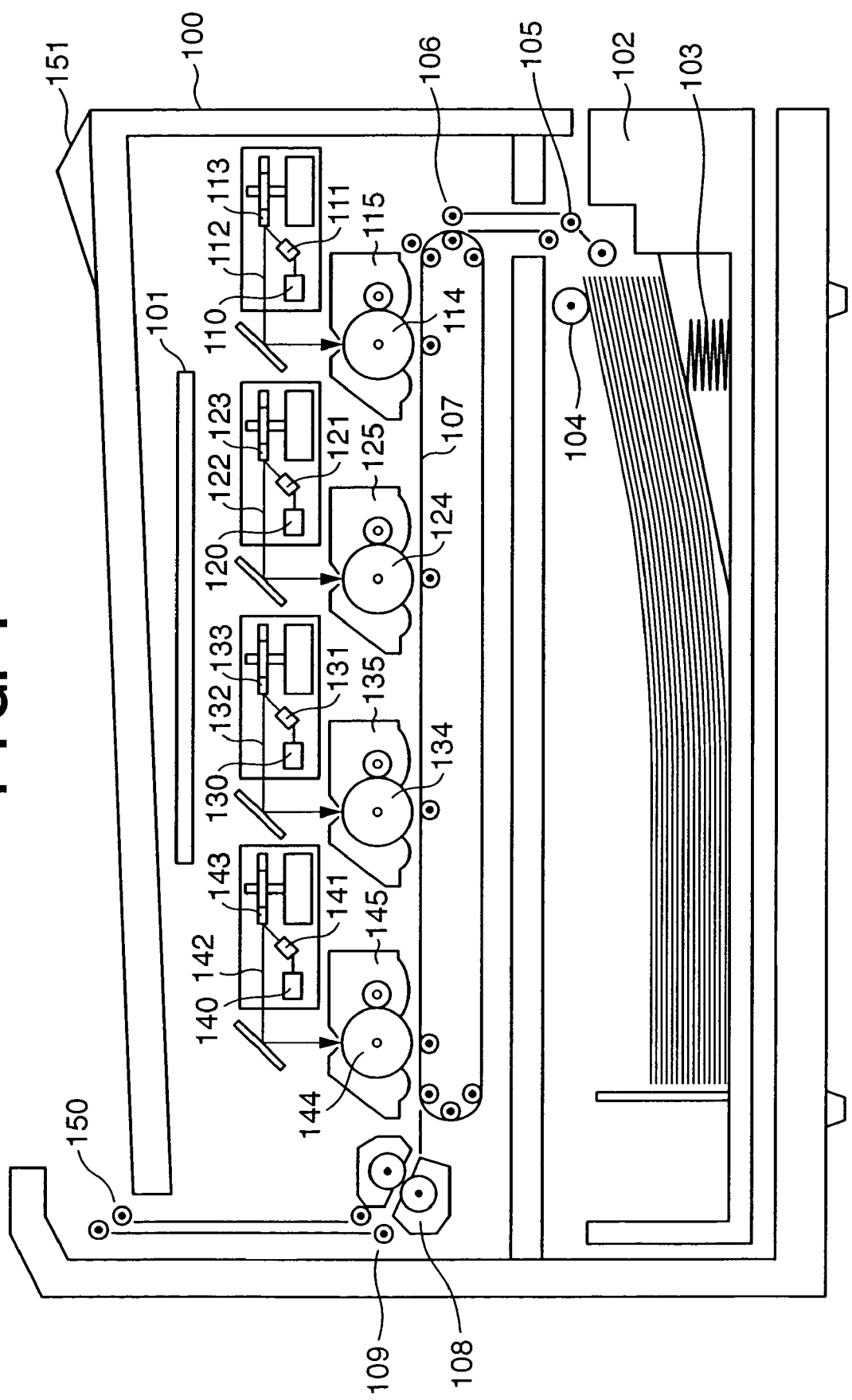
FIG. 1 depicts a cross-sectional view showing the inner structure of a color laser beam printer (LBP) as one example of the image processing apparatus of an embodiment of this invention.

FIG. 1 depicts a cross-sectional view showing the inner structure of a color laser beam printer (LBP) as one example of the image processing apparatus of the embodiments of this invention.

In the Figure, reference numeral 100 denotes a main body of an LBP. In accordance with character printing commands, various picture description instructions, image drawing commands, color specification commands and the like that are supplied from an external host computer (external device: 201 of FIG. 2), the LBP main unit 100 creates each of the corresponding character patterns, graphics, images or the like to form an image on a recording paper as a recording medium. On a console 151 are disposed switches that allow operations by a user as well as an LCD indicator or LED indicator that displays the printer status and the like. A printer controller 101 controls an operation of the LBP 100 and analyzes printing commands and the like supplied from the host computer 201. The LBP 100 converts color data of R (red), G (green) and B (blue) into M (magenta), C (cyan), Y (yellow) and K (black) to perform image formation and develop these color data in parallel. The LBP 100 comprises image forming and developing devices for M, C, Y and K, respectively, in order from the right side of FIG. 1. The printer controller 101 generates print image data respectively for M, C, Y and K, and converts the print image data to video signals for respective colors and outputs the video signals to the respective laser drivers of M, C, Y and K.

A laser driver 110 of M (magenta) is a circuit for driving a semiconductor laser 111, and performs ON/OFF switching of a laser beam 112 that is emitted from the semiconductor laser 111 in accordance with the video signal supplied from the printer controller 101. The laser beam 112 is reflected in a horizontal direction (longitudinal direction of a photosensitive drum 114) by a polygonal mirror 113 to scan the surface of the photosensitive drum 114. As a result, an electric static latent image of a pattern of characters or graphics is formed on the photosensitive drum 114. The electric static latent image is developed by a developing unit (toner cartridge) 115 peripherally provided on the photosensitive drum 114, and the developed image is transferred to a recording paper.

Image forming and developing mechanisms that are of the same kind as those for M (magenta) are also provided for C (cyan), Y (yellow) and K (black). Reference numerals 120 to 125 denote the image forming and developing mechanisms for C (cyan), reference numerals 130 to 135 denote the image forming and developing mechanisms for Y (yellow) and reference numerals 140 to 145 denote the image forming and developing mechanisms for K. The functions and operation of each part of the respective image forming and developing mechanisms are the same as the corresponding parts of the image forming and developing devices of M (magenta), and a description thereof is thus omitted here.

In the embodiment, a cut sheet is used for the recording paper, and the recording papers are stacked in a paper cassette 102 mounted in the LBP 100 and maintained at a constant height by a spring 103. The recording paper is then fed into the LBP main body 100 by rotation of a paper (pick-up) roller 104 and feed rollers 105 and 106, placed on a conveyance belt 107 and conveyed in a direction from the right side of FIG. 1 to the left. While the recording paper passes through the respective image forming and developing mechanisms of M, C, Y and K, images according to each color are transferred onto the recording paper. The respective toners (powdered ink) of M, C, Y and K that have been transferred onto the recording paper are fixed onto the recording paper by pressure and heat of a fixing unit 108, and the recording paper is then ejected from the top part of the LBP main body 100 by rotation of feed rollers 109 and 150.

Figure 2:
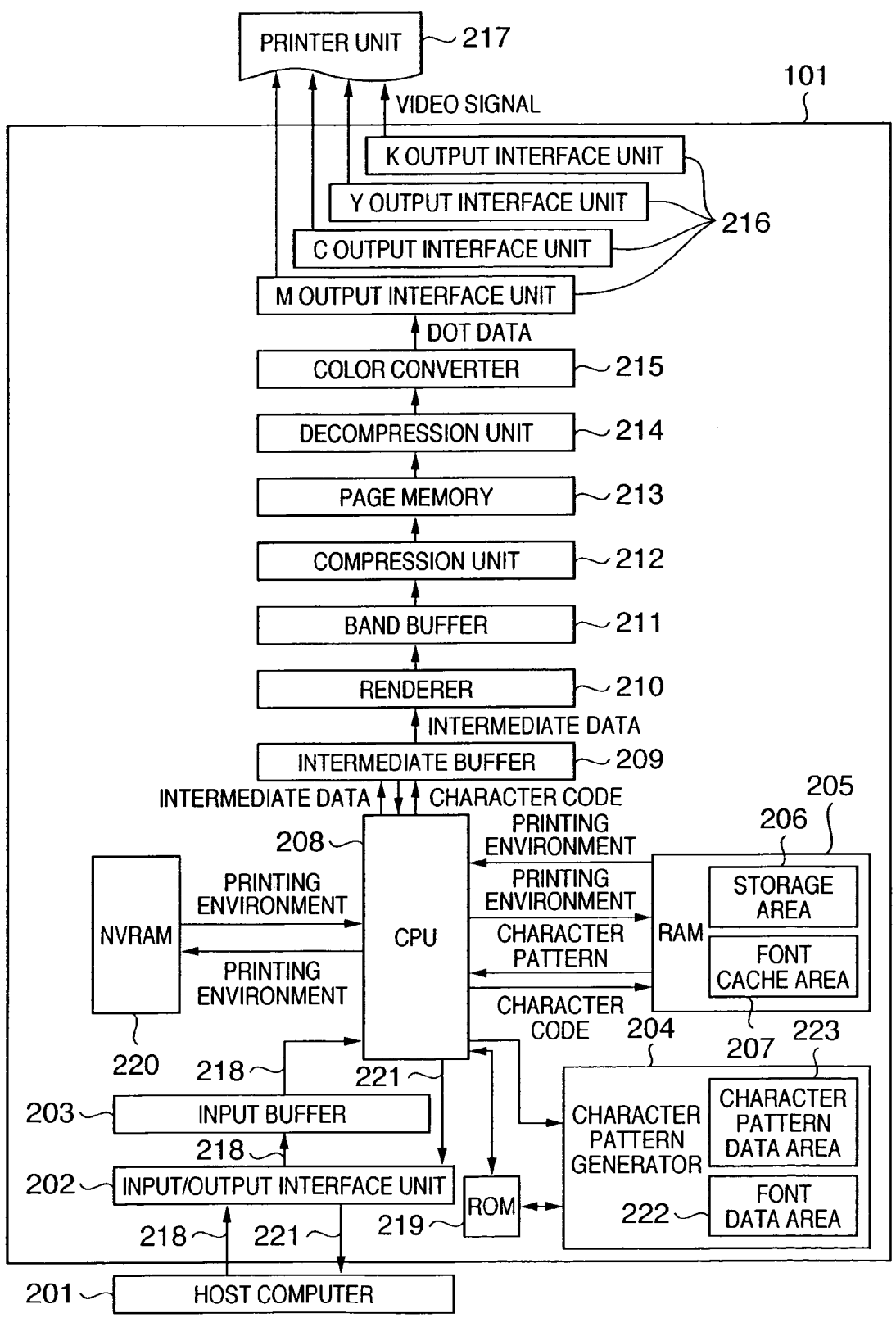
FIG. 2 is a block diagram showing a configuration of a printer controller of the LBP of the embodiment.

FIG. 2 is a block diagram showing the configuration of the printer controller 101 of the LBP 100 of the embodiment. The printer controller 101 inputs data 218 sent from the host computer 201 as the source of print data, the data 218 comprises color data and respective drawing commands for characters, graphics and images, and then controller 101 expands the data 218 in images of page units for printing.

An input/output interface unit 202 exchanges various information with the host computer 201. An input buffer 203 temporarily stores various information input via the input/output interface unit 202. A character pattern generator 204 includes a font data area 222 in which attributes such as the width and height of characters or the addresses of character pattern data are stored, a character pattern data area 223 in which the character pattern data is stored, and a read control program thereof, and the character pattern generator 204 generates character patterns in accordance with input character codes and the attribute information thereof. The read control program is stored in a ROM 219, and it also has a code conversion function that, when a character code is input, calculates the address of the character pattern data corresponding to the character code and converts the character code into character pattern data. A RAM 205 includes a font cache area 207 that stores character pattern data output from the character pattern generator 204, and a storing area 206 that stores extra character fonts or form information and the current printing environment and the like sent from the host computer 201. Thus, the developed character pattern data is stored as a font cache in the font cache area 207, so that it is not necessary to develop the character code into character pattern data upon printing the same character code, and therefore the speed of developing to character pattern data becomes faster.

A CPU 208 controls the overall control system of the LBP 100, and controls the apparatus in accordance with a control program stored in the ROM 219. An intermediate buffer 209 stores a group of internal data (intermediate data) generated on the basis of the input data 218 input via the input/output interface unit 202. After print data for one page has been received and the print data has been converted into simpler intermediate data and stored in the intermediate buffer 209, the intermediate data is rendered in units of several lines by a renderer 210 and then stored in a band buffer 211 as print image data. The renderer 210 generates 8 bits (per pixel) of bitmap data for each of the colors of RGB in units of several lines, and at the same time, generates an object specifying data image of a total of 4 bits per pixel (bpp), in which 3 bits show whether each pixel is that of a character, a graphic or an image and 1 bit shows whether to print with K only or to print with a mixture of YMCK when R=G=B. The object specifying data image is added in 4 bits of each pixel data, and is set in correspondence with the bitmap image. Hereunder, these object specifying data images for each pixel are referred to simply as "object specifying data."

Further, the band buffer 211 stores object specifying data and RGB bitmap data for at least 8 lines. At this time, the object specifying data and bitmap data for drawing are compressed separately. More specifically, the object specifying data and RGB bitmap data for at least 8 lines are output from the band buffer 211, and are compressed in units of several lines by a compression unit 212 and stored in a page memory 213. After intermediate data for one page that is stored in the intermediate buffer 209 has been rendered, compressed and stored in the page memory 213 in this manner, the compressed data is read out by a decompression unit 214 in units of several lines for decompression and is expanded. At this time, the object specifying data and bitmap data are read out and are decompressed separately. For the decompressed data, a color converter 215 converts 8-bit (per pixel) bitmap data of each color of RGB into 4-bit (per pixel) bitmap data for each color of YMCK.

More specifically, 8-bit (per pixel) bitmap data for each color of RGB is converted into 10-bit (per pixel) bitmap data for each color of YMCK, and the 10-bit (per pixel) bitmap data for each color of YMCK is further converted into 10-bit (per pixel) bitmap data for each color of YMCK using gamma correction. Further, the 10-bit (per pixel) bitmap data for each color of YMCK undergoes halftoning processing to convert it into data of 4 bits (per pixel) for each color of YMCK. Upon converting color of each pixel of the bitmap data, a method of converting colors is changed in accordance with the object specifying data of the pixel.

More specifically, with reference to the 1 bit (per pixel) of the object specifying data, which indicates whether to print only in K or to print in a mixture of YMCK, and the 8-bit (per pixel) data for each color of RGB is converted into 10-bit (per pixel) data for each color of YMCK. Next, with reference to the 3 bits (per pixel) of the object specifying data, which indicates whether each pixel is for a character, a graphic or an image, and the 10-bit (per pixel) data for each color of YMCK is converted into 4-bit (per pixel) data of YMCK.

An output interface unit 216 outputs the respective video signals of MCYK to a printer unit 217. The printer unit 217 is a printing mechanism (printer engine) of a page printer for printing an image based on video signals of each color received from the output interface unit 216.

Since the LBP 100 of the embodiment performs image formations and developments of M, C, Y and K in parallel, the output interface unit 216 comprises interface units for these four colors, that is, an M (magenta) output interface unit, a C (cyan) output interface unit, a Y (yellow) output interface unit and a K (black) output interface unit. Each of these interface units independently acquires corresponding color image data from the color converter 215 to convert the image data into a video signal, and outputs the video signal to the laser driver 110, 120, 130 or 140 (FIG. 1) corresponding to each color. A nonvolatile memory (NVRAM (nonvolatile RAM)) 220 is composed of a common EEPROM or the like, and it stores setting values and the like set by a user using the console 151. Reference numeral 221 denotes data sent from the LBP 100 to the host computer 201. The ROM 219 also includes a control program of analyzing data input from the host computer 201, generating intermediate data and controlling of the printer unit 217, and tables and the like used when performing color conversion from 8-bit (per pixel) data of each color of YMCK to 4-bit (per pixel) data of each color of YMCK.

Although the embodiment is described taking a color laser printer as an example, the printer may also be a color printer such as a color inkjet printer or color thermal transfer printer and the like.

Further, although in the embodiment the renderer 210 generates 8-bit (per pixel) bitmap data for each color of RGB, the renderer 210 may generate 8-bit (per pixel) bitmap data for each color of YMCK in units of several lines. The renderer 210 may also generate 8-bit (per pixel) bitmap data for gray in units of several lines. Further, the number of bits per pixel of each color may be any value. In this case, the band buffer 211, the compression unit 212, the page memory 213 and the decompression unit 214 may support the color space and the number of bits per pixel generated by the renderer 210. Further, the color converter 215 may convert data decompressed by the decompression unit 214, that is, data generated by the renderer 210, into data of a color space and the number of bits per pixel that are compatible with the output interface unit 216. For example, if the renderer 210 generates YMCK data, the color converter 215 may convert each color of YMCK into YMCK data of 4 bits (per pixel). Also, if the renderer 210 generates 8-bit (per pixel) bitmap data of gray, the compression unit 212 and the decompression unit 214 may compress and decompress the 8-bit (per pixel) data of gray, and the color converter 215 may convert the 8-bit (per pixel) data of gray into 4-bit (per pixel) data of K.

Figure 3B:
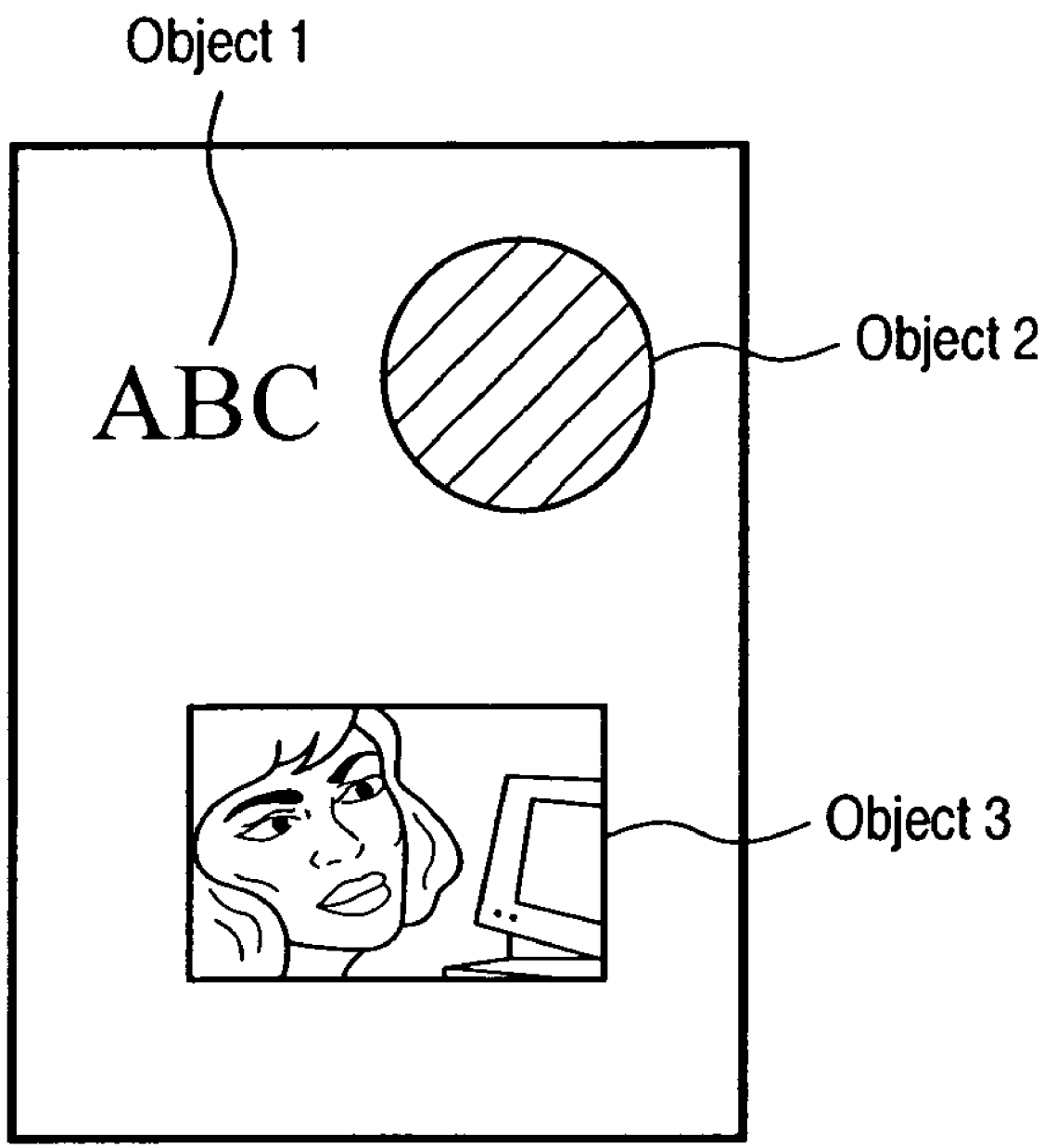

FIG. 3A depicts a view showing an example of intermediate data stored in the intermediate buffer 209 of the embodiment, and FIG. 3B depicts a view showing an example of bitmap data generated by the renderer 210 of the embodiment.

Figure 4A:
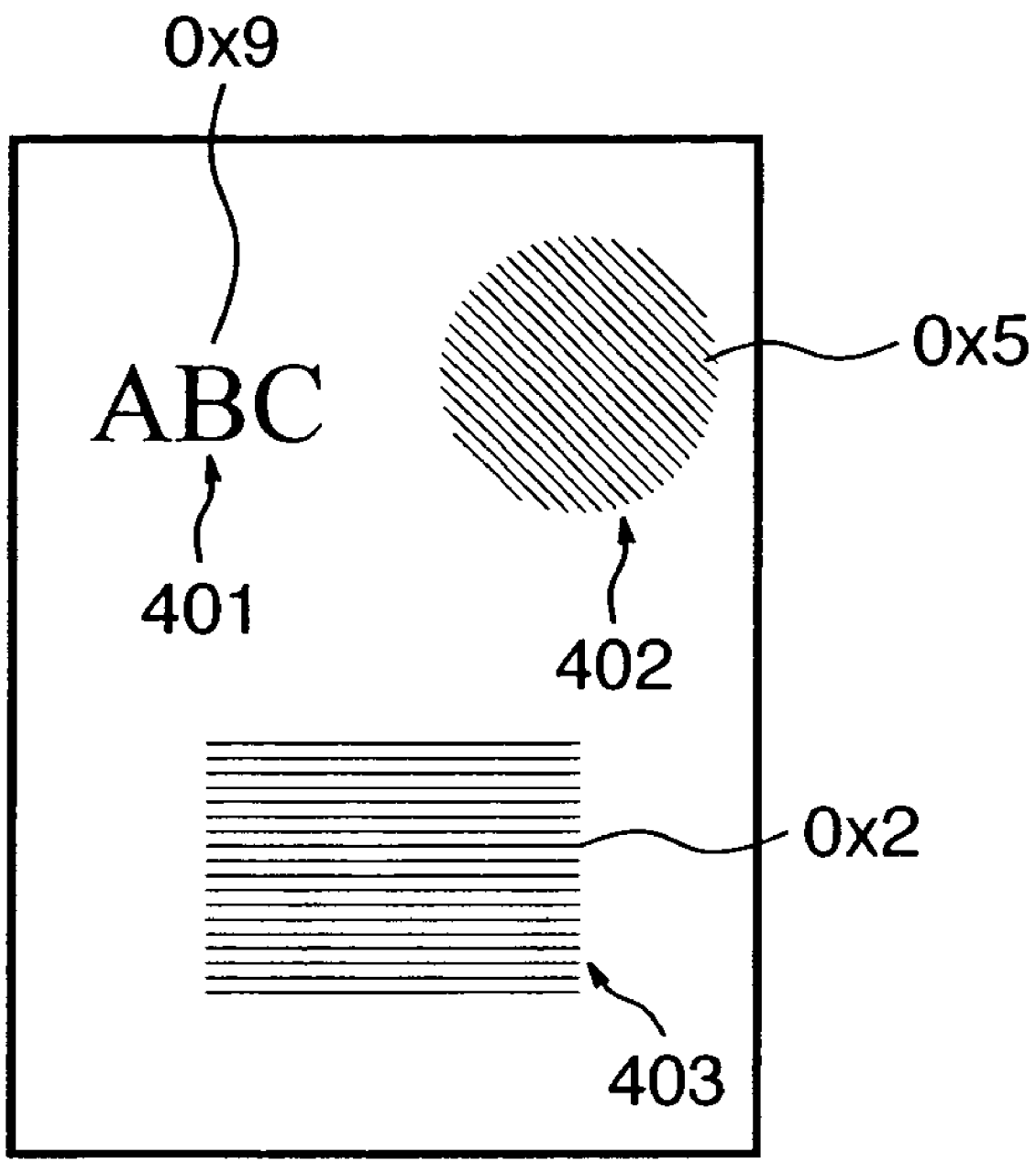
FIGS. 4A and 4B depict views illustrating an example of object specifying data generated by the renderer of the embodiment, and an example of second bitmap data generated by a color converter.
Figure 4B:
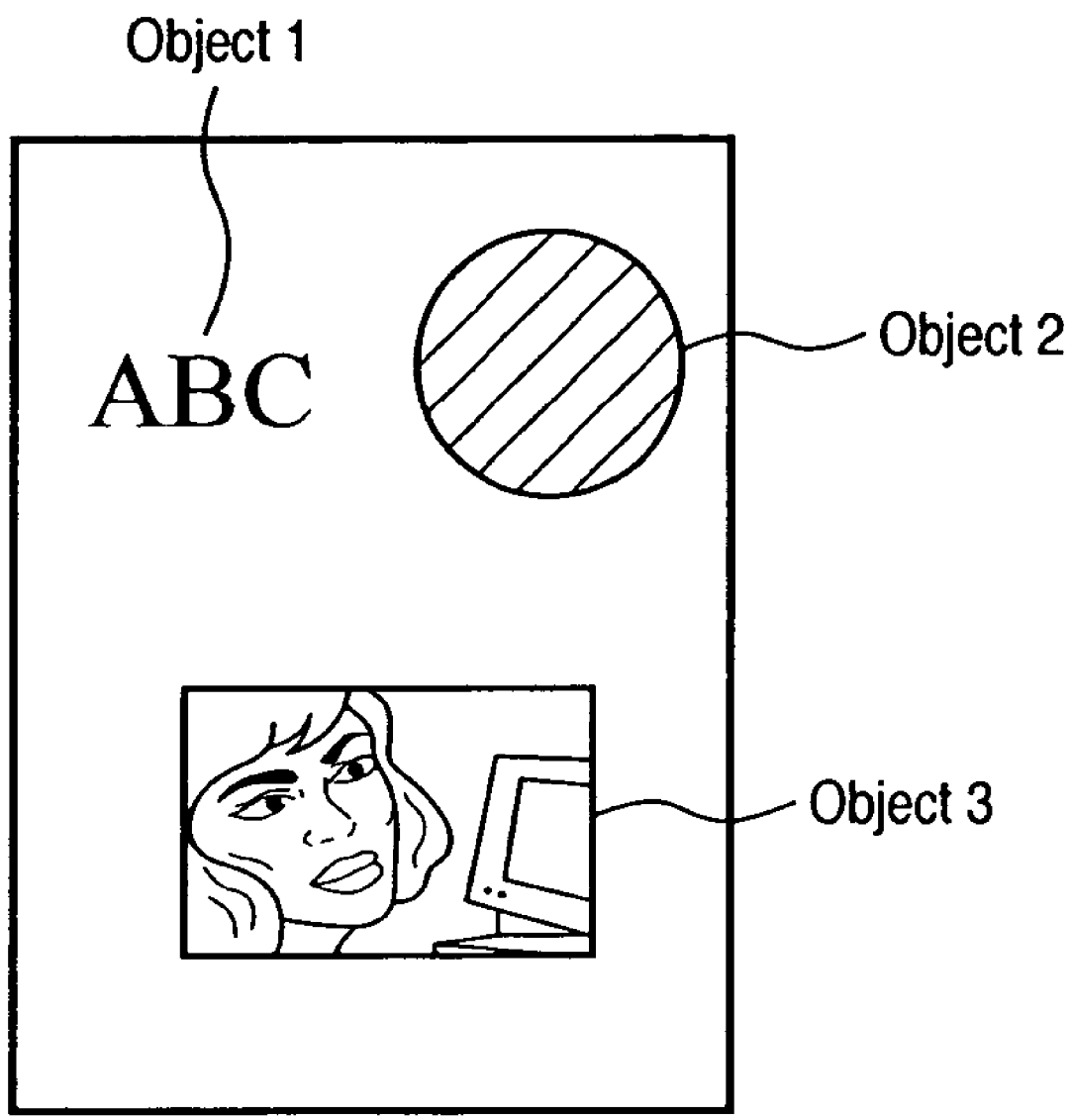

FIG. 4A depicts a view showing an example of object specifying data generated by the renderer 210 of the embodiment, and FIG. 4B depicts a view showing an example of second bitmap data generated by the color converter 215 of the embodiment.

First, the CPU 208 determines whether an input drawing command is a character command, a graphic command or an image command, and whether to print only in K or to print with a mixture of YMCK so as to create intermediate data, and the respective flags (object specifying data) are set for intermediate data stored in the intermediate buffer 209 (FIG. 4A).

More specifically, as shown in FIG. 3A, the attribute "character", the color attribute "K (black)", a print position (X, Y), a font name, a size, character codes (ABC), a color (black (R=G=B=255)) and a drawing logic are provided for "Object 1".

For "Object 2", the attribute "graphic", the color attribute "K", the shape "circular", a print position (X, Y), a radius, a color (R=255, G=0, B=0) and a drawing logic are provided.

Further, for "Object 3", the attribute "image", the color attribute "YMCK", a print position (X, Y), an image width and height, a pointer to the image data and a drawing logic are provided. The drawing logic of all of the objects 1-3 is S (substitute).

Thus, the intermediate data includes information of the attribute, color, print position and the like of the respective drawing objects.

The renderer 210 renders the intermediate data such that the bitmap image (FIG. 3B) as well as the object specifying data (FIG. 4A) are obtained.

Here, the bitmap data (FIG. 3B) is obtained in a case where the intermediate data is rendered with 8-bit (per pixel) data for each color of RGB. An area in which nothing is rendered is represented by white RGB (R=0xff, G=0xff, B=0xff).

The items (0x9, 0x5, 0x2) of the object specifying data shown in FIG. 4A are rendered with 4-bit (per pixel) data using the attributes and color attributes of the intermediate data.

More specifically, the contents of the 4 bits per pixel are as follows:

Bit 0: "1" in a case where color attribute is K, and "0" in a case where color attribute is YMCK Bit 1: "1" in a case where attribute is image, and "0" otherwise Bit 2: "1" in a case where attribute is graphic, and "0" otherwise Bit 3: "1" in a case where attribute is character, and "0" otherwise Hence, on the basis of FIG. 3A, the low-order 4-bit of the object specifying data of each pixel of a character region 401 in FIG. 4A is represented by "9" (hexadecimal number) (attribute is "character" (Bit 3=1), and color attribute is "K" (Bit 0=1)), the low-order 4-bit of data of each pixel of a graphic region 402 in FIG. 4A is represented by "5" (hexadecimal number) (attribute is "graphic" (Bit 2=1), and color attribute is "K" (Bit 0=1)), and the low-order 4-bit of data of each pixel of an image region 403 in FIG. 4A is represented by "2" (hexadecimal number) (attribute is "image" (Bit 1=1), and color attribute is "YMCK" (Bit 0=0)). Areas in which nothing is drawn are represented by "0x0".

Thus, second bitmap data is obtained and comprises attributes corresponding to each pixel of the image data showing the printing result (FIG. 4B).

Upon generating the second bitmap data of FIG. 4B from the first bitmap data of FIG. 3B, parameters of the processing are changed in accordance with the attribute results of FIG. 4A.

More specifically, using bit 0 (showing whether to print with K only or to print with a mixture of YMCK) of the object specifying data, the 8-bit (per pixel) data for each color of RGB is converted into 10-bit (per pixel) data for each color of YMCK.

Here, the pixel value of bitmap data corresponding to a pixel for which bit 0 of the object specifying data is "1" (black), is converted from RGB to YMCK using a look-up table that compensates Y=M=C=0 when R=G=B. In contrast, when bit 0 of the object specifying data is "0", the pixel value of bitmap data corresponding to a pixel is converted from RGB to YMCK using a look-up table that does not compensate Y=M=C=0 when R=G=B.

Next, using bit 1 to bit 3 (3 bits (per pixel) showing whether each pixel is for a character, a graphic or an image) of the object specifying data, the 10-bit (per pixel) data of each color of YMCK is converted into 4-bit (per pixel) data of YMCK.

Concrete examples of this conversion are as follows. The pixel value of bitmap data corresponding to a pixel for which bit 1 of the object specifying data is "1" (image) is converted from 10-bit (per pixel) data for each color of YMCK into 4-bit (per pixel) data for YMCK using halftone parameters for images.

In addition, the pixel value of bitmap data corresponding to a pixel for which bit 2 of the object specifying data is "1" (graphic) is converted from 10-bit (per pixel) data for each color of YMCK into 4-bit (per pixel) data for YMCK using halftone parameters for graphics.

Further, the pixel value of bitmap data corresponding to a pixel for which bit 3 of the object specifying data is "1" (character) is converted from 10-bit (per pixel) data for each color of YMCK into 4-bit (per pixel) data for YMCK using halftone parameters for characters.

Thus, the second bitmap data can be generated using the optimal color conversion parameters and halftone parameters for each region (object).

When the renderer 210 generates 8-bit (per pixel) bitmap data of gray, bit 0 of the object specifying data of the pixel data is ignored, and 8-bit (per pixel) bitmap data of gray is converted into 10-bit (per pixel) bitmap data of K.

Furthermore, using bit 1 to bit 3 (3 bits showing whether each pixel is for a character, a graphic or an image) of the object specifying data, the 10-bit (per pixel) bitmap data of K is converted into 4-bit (per pixel) bitmap data of K.

FIG. 5 depicts a view explaining the settings of various parameters set separately for each type of object (character, graphic or image) of the embodiment. According to the embodiment, the settings can be made for characters, graphics and images, as shown in FIG. 5. In the embodiment, these settings are set using the user interface of the host computer 201, and sent from the host computer 201 to the printer 100. Also, the types of objects may be employed that allows other objects, for example, thin lines, small characters and the like, to be specified in addition to the above types of objects. In such case, the number of bits of the above-described object specifying data and the configuration of each bit may be different from that in the embodiment.

The setting "set compensation of K" designates whether or not ("ON" or "OFF") to perform "compensation of conversion of R=G=B to K" (compensation of K), or whether to perform it automatically (AUTOMATIC). The setting "Set compensation of C" designates whether or not ("ON" or "OFF") to perform "compensation of conversion of G=B= (maximum brightness value) (for example, in the case of 8-bit data, G=B=255) to C" (compensation of C), or whether to perform it automatically (AUTOMATIC). The setting "Set compensation of M" designates whether or not ("ON" or "OFF") to perform "compensation of conversion of R=B= (maximum brightness value) into M" (compensation of M), or whether to perform it automatically (AUTOMATIC). The setting "Set compensation of Y" designates whether or not ("ON" or "OFF") to perform "compensation of conversion of R=G=(maximum brightness value) into Y" (compensation of Y), or whether to perform it automatically (AUTOMATIC). The setting "Set compensation of CM" designates whether or not ("ON" or "OFF") to perform "compensation of C=M= (maximum density value) and Y=K=0, in a case where B=(maximum brightness value) and R=G=0" (compensation of CM), or whether to perform it automatically (AUTOMATIC). The setting "Set compensation of MY" designates whether or not ("ON" or "OFF") to perform "compensation of M=Y=(maximum density value) and C=K=0, in a case where R=(maximum brightness value) and G=B=0" (compensation of MY), or whether to perform it automatically (AUTOMATIC). Further, The setting "set compensation of CY" designates whether or not ("ON" or "OFF") to perform "compensation of C=Y=(maximum density value) and M=K=0, in a case where G=(maximum brightness value) and R=B=0" (guarantee of CY), or whether to perform it automatically (AUTOMATIC).

Though all items are set in "AUTOMATIC" in FIG. 5, in the embodiment, all items may be set to "ON". Further, in a case where "AUTOMATIC" is selected, the preset default settings come into effect. The default settings differ in accordance with the printing mode, for example, upon printing data of a standard document, in the settings for character and graphic, only "compensation of K" may be set to "ON" and the other compensations may be set to "OFF." Further, all the compensations in the setting for image may be set to "ON."

Further, for example, if the printing mode is that for printing a CAD document, "compensation of K" settings in the settings for character and graphic may be set to "ON", while all compensations in the settings for image may be set to "OFF."

Figure 6:
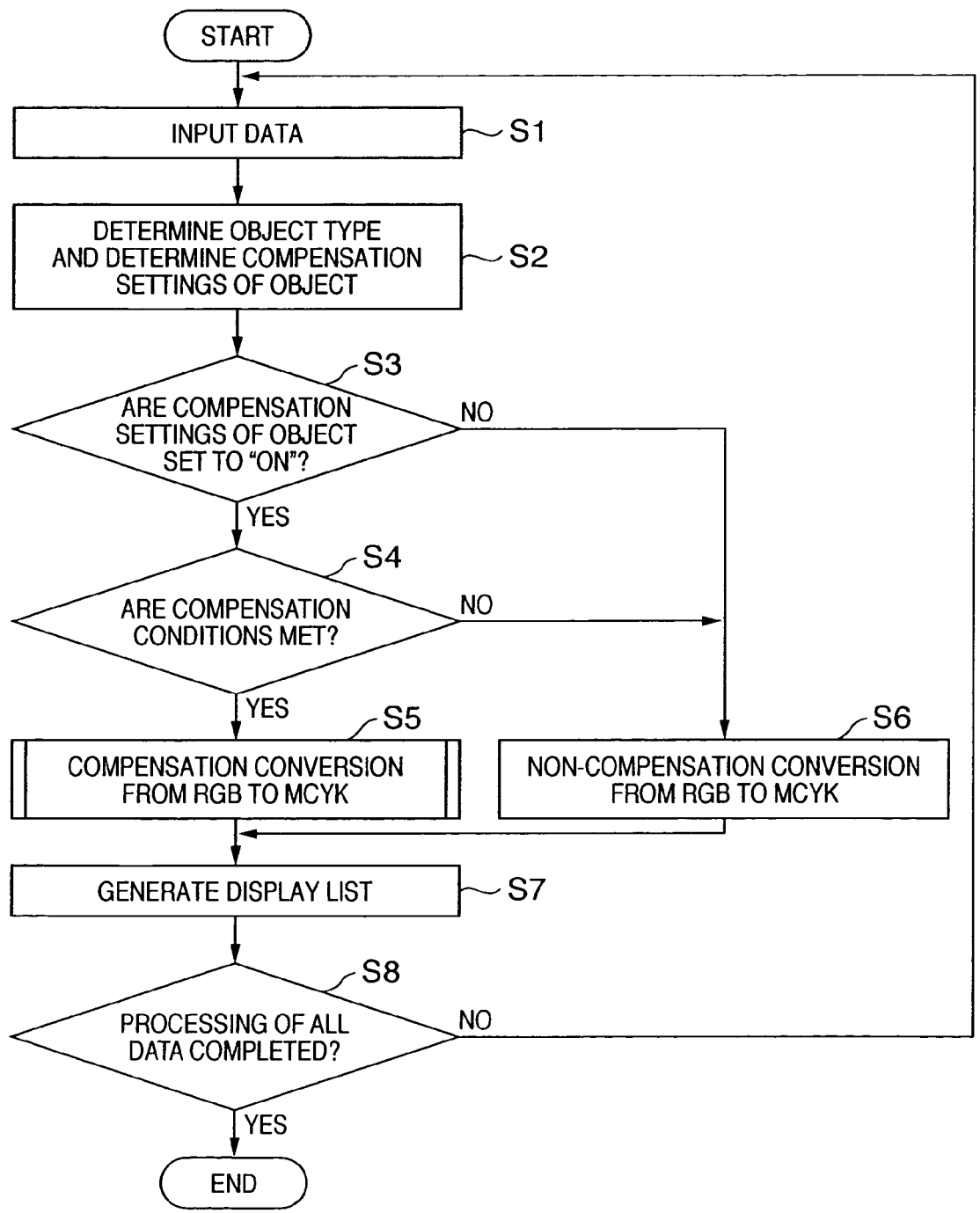
FIG. 6 is a flowchart for describing the processing of a printer controller of the first embodiment of this invention.

FIG. 6 is a flowchart for illustrating the processing of the printer controller 101 of the first embodiment of the invention. A program for implementing the processing is stored on the ROM 219 and the processing is implemented under the control of the CPU 208.

A drawing command is input in step S1, the process is advanced from step S1 to step S2 to determine the type of object (character, graphic or image) included in the drawing command. Next, in step S3, the type of object detected in step S2 and the compensation settings specified for each type of object (FIG. 5) are compared. The compensation settings in this case are received through a job ticket in accordance with settings made using the user interface of the host computer 201. Here, if it is determined in step S3 that the setting for the object type is "compensation settings=ON", the process proceeds to step S4, otherwise the process proceeds to step S6.

In step S4, the pixel values of the drawing command are determined, and it is determined whether or not the pixel values meet with the conditions set in the compensation settings. If it is determined that the conditions set in the compensation settings are met, the process is advanced to step S5 to convert RGB pixel values into the compensation value. The determination is performed based upon whether R=G=B for compensation of K, whether G=B=(maximum brightness value) for compensation of C, whether R=B=(maximum brightness value) for compensation of M, whether R=G= (maximum brightness value) for compensation of Y, whether B=(maximum brightness value) and R=G=0 for compensation of CM, whether R=(maximum brightness value) and G=B=0 for compensation of MY, and whether G=(maximum brightness value) and R=B=0 for compensation of CY.

In step S4, if it is determined that the compensation setting conditions are not met, then the process proceeds to step S6, where RGB pixel values are converted into a non-compensation value (CMYK). Thus, when step S5 or step S6 is implemented, the process is advanced to step S7 to store the converted data in the intermediate buffer 209 as a display list. Subsequently, in step S8, it is determined whether the processing of drawing commands for one page has been completed, and if it is determined in step S8 that the processing has been completed, the process is terminated and the generated display list is sent to the renderer 210. If the processing has not been completed, the process returns to step S1 to execute the above-described processing again. In this example, the renderer 210 generates bitmap image data of a CMYK color space.

For the conversion of step S6, a color matching method may be set in advance for the object units and may be switched by changing the look-up table in accordance with the type of object. Examples of this switching method include matching methods established by the ICC (International Color Consortium), and the following types of methods are known.

Perceptual
Colorimetric
Saturation

Further, the conversion methods in step S5 in a case where the conditions and compensation conditions matches in step S4 are as follows.

Compensation of K: if R=G=B, then convert to K
Compensation of C: if G=B=(maximum brightness value), then convert to C
Compensation of M: if R=B=(maximum brightness value), then convert to M
Compensation of Y: if R=G=(maximum brightness value), then convert to Y
Compensation of CM: if B=(maximum brightness value) and R=G=0, then convert to C=M=(maximum density value) and Y=K=0
Compensation of MY: if R=(maximum brightness value) and G=B=0, then convert to M=Y=(maximum density value) and C=K=0
Compensation of CY: if G=(maximum brightness value) and R=B=0, then convert to C=Y=(maximum density value) and M=K=0

By performing color compensation in accordance with the previously set compensation conditions, it is possible to compensate a single color, even when the color for compensation is C, M or Y. (That is, a single color compensation of coloring materials is enabled.)

Further, a color compensation of a secondary color (representation of a color using two coloring materials of MCYK) is also enabled.

Next, the compensation conversion processing from RGB to MCYK in step S5 of FIG. 6 will be described referring to the flowcharts of FIGS. 7 to 9. The example described here is that for the various settings shown in FIG. 5, and for the purpose of simplification, a description relating to compensation conversion processing that corresponds to a printing mode or an object attribute will be omitted in this description.

Figure 7:
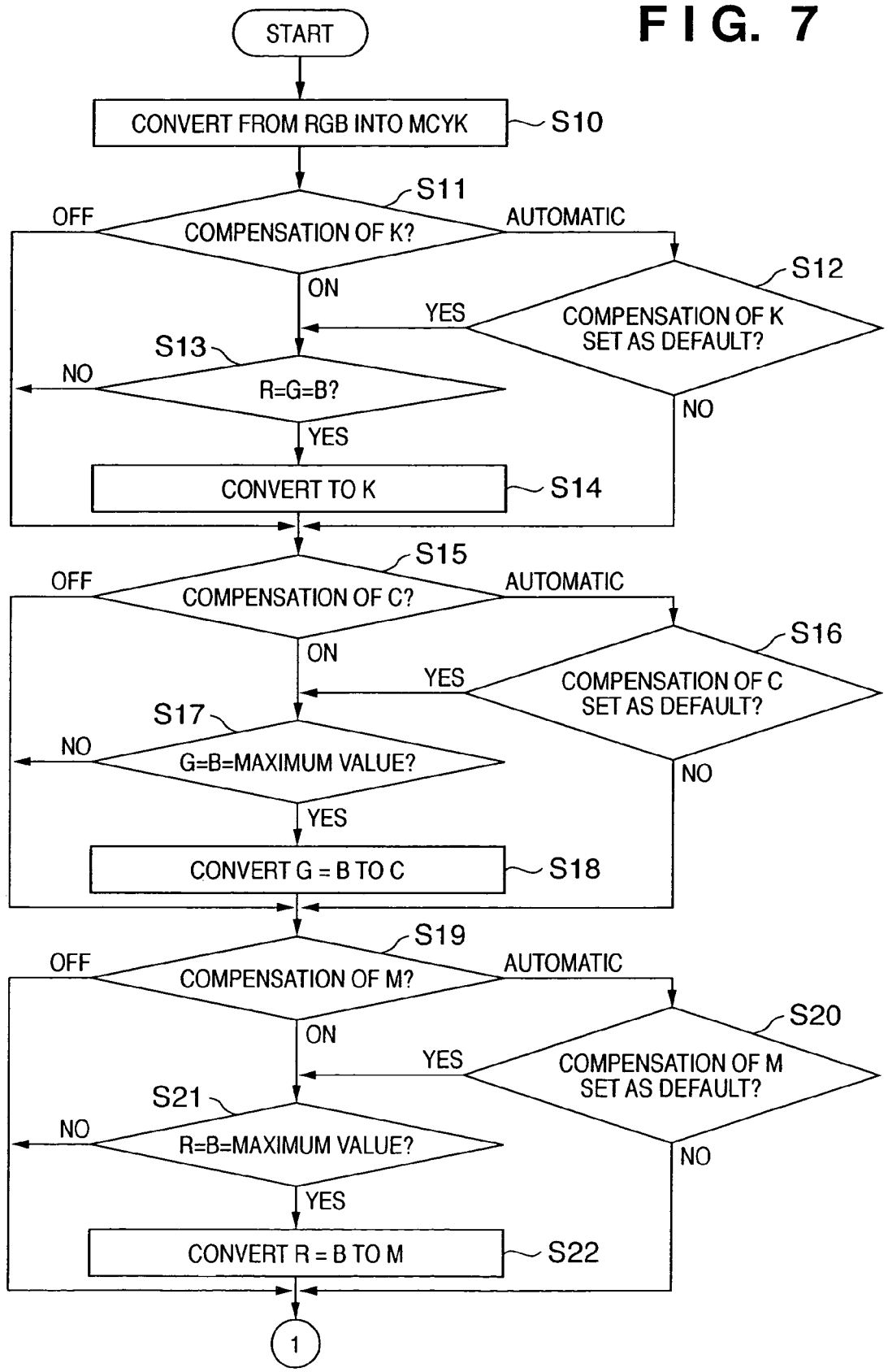
FIG. 7 is a flowchart for describing compensation conversion processing from RGB to MCYK (step S5 of FIG. 6) according to an embodiment of this invention.
Figure 8:
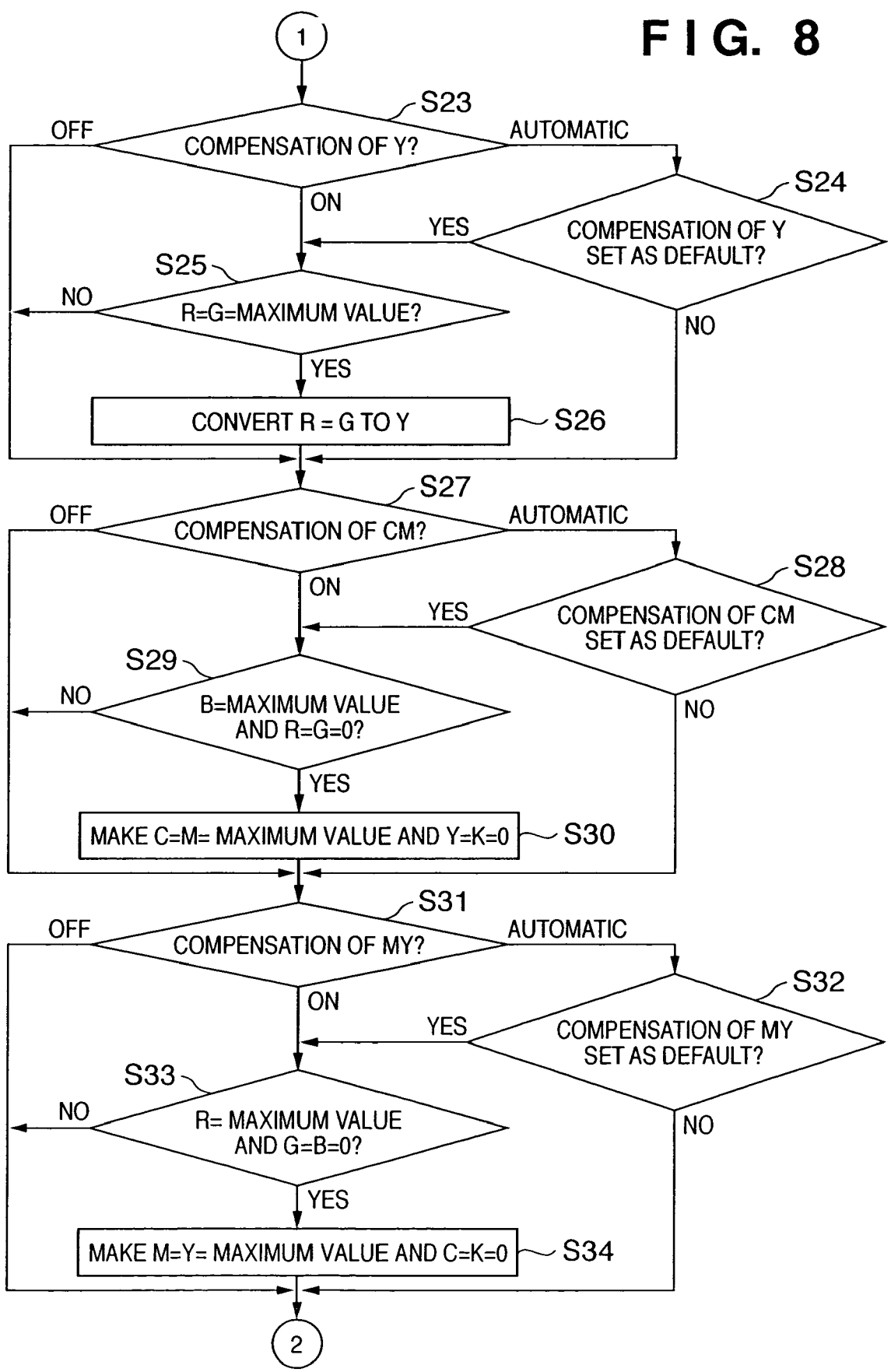
FIG. 8 is a flowchart for describing compensation conversion processing from RGB to MCYK (step S5 of FIG. 6) according to an embodiment of this invention.
Figure 9:
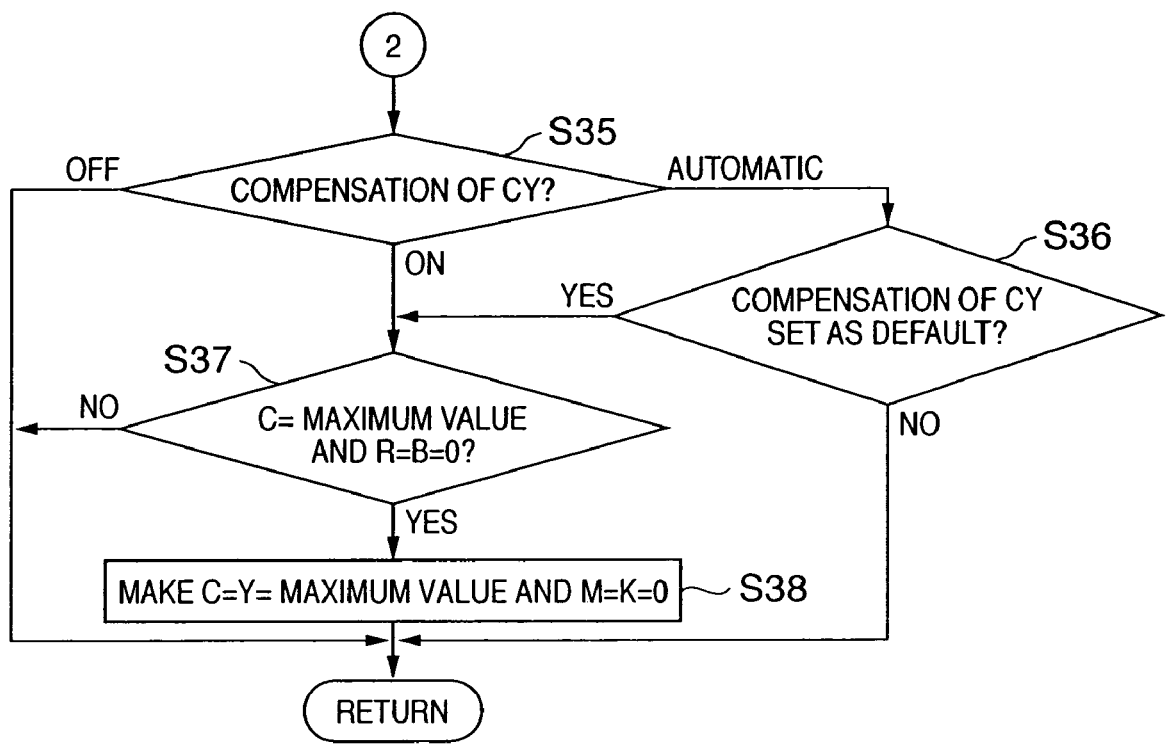
FIG. 9 is a flowchart for describing compensation conversion processing from RGB to MCYK (step S5 of FIG. 6) according to an embodiment of this invention.

FIG. 7 to FIG. 9 are flowcharts that illustrate the compensation conversion processing from RGB to MCYK according to one embodiment (step S5 in FIG. 6) of this invention.

First, in step S10, a normal conversion from RGB to MCYK is performed and the converted result is stored in the RAM 205. In the processing thereafter, in a case where the respective compensations are set, the stored corresponding pixel values are replaced with values undergone the compensation conversion. Accordingly, in the following processing, the original RGB values of each pixel are referred to. First, in step S11, the setting of "compensation of K" is examined, and if the setting is "ON", then the process proceeds to step S13, if the setting is "Automatic", then the process proceeds to step S12, and if the setting is "OFF", then the process proceeds to step S15. In step S12, it is determined whether or not "compensation of K" is set as the default setting, and if it is not set as the default setting, then the process proceeds from step S12 to step S15. If "compensation of K" is set as the default setting, then the process proceeds from step S12 to step S13 to determine whether or not a pixel for satisfying R=G=B as the condition of "compensation of K" exists. If exist, the process proceeds to step S14 to convert the values of the pixel in the RAM 205 into K (M=C=Y=0), and the process proceeds to step S15. If it is determined in step S13 that the condition of "compensation of K" is not satisfied, then the process proceeds to step S15.

Next, in step S15, the setting of "compensation of C" is examined, and if the setting is "ON", then the process proceeds to step S17, if the setting is "Automatic", then the process proceeds to step S16, and if the setting is "OFF", then the process proceeds to step S19. In step S16, it is determined whether or not "compensation of C" is set as the default setting, and if it is not set as the default setting, then the process proceeds from step S16 to step S19. If "compensation of C" is set as the default setting in step S16, the process proceeds to step S17 to determine whether or not a pixel for satisfying G=B=(maximum brightness value) as the condition of "compensation of C" exists. If such a pixel exists, then the process proceeds to step S18 to convert the G and B values of the pixel in the RAM 205 into C, and then the process proceeds to step S19. If it is determined in step S17 that the condition of "compensation of C" is not satisfied, the process proceeds to step S19.

Next, in step S19, the setting of "compensation of M" is examined, and if the setting is "ON", then the process proceeds to step S21, if the setting is "Automatic", then the process proceeds to step S20, and if the setting is "OFF", then the process proceeds to step S23 (FIG. 8). In step S20, it is determined whether or not "compensation of M" is set as the default setting, and if it is not set as the default setting, then the process proceeds to step S23. If "compensation of M" is set as the default setting, then the process proceeds from step S20 to step S21 to determine whether or not a pixel for satisfying R=B=(maximum brightness value) as the condition of "compensation of M" exists. If such a pixel exists, then the process proceeds to step S22 to convert the R=B values of that pixel in the RAM 205 into M, and the process proceeds to step S23. If it is determined in step S21 that the condition of "compensation of M" is not satisfied, then the process also proceeds to step S23.

Next, in step S23 of FIG. 8, the setting of "compensation of Y" is examined, and if the setting is "ON", then the process proceeds to step S25, if the setting is "Automatic", then the process proceeds to step S24, and if the setting is "OFF", then the process proceeds to step S27. In step S24, it is determined whether or not "compensation of Y" is set as the default setting, and if it is not set as the default setting, the process proceeds from step S24 to step S27. If "compensation of Y" is set as the default setting, then the process proceeds from step S24 to step S25 to determine whether or not a pixel for satisfying R=G=(maximum brightness value) as the condition of "compensation of Y" exists. If such a pixel exists, then the process proceeds to step S26 to convert the R=G values of the pixel in the RAM 205 into Y, and the process proceeds to step S27. If it is determined in step S25 that the condition of "compensation of Y" is not satisfied, then the process proceeds to step S27.

Next, in step S27, the setting of "compensation of CM" is examined, and if the setting is "ON", then the process proceeds to step S29, if the setting is "Automatic", then the process proceeds to step S28, and if the setting is "OFF", then the process proceeds to step S31. In step S28, it is determined whether or not "compensation of CM" is set as the default setting, and if it is not set as the default setting, then the process proceeds to step S31. It is determined in step S28 whether "compensation of CM" is set as the default setting, if so, the process proceeds to step S29 to determine whether or not a pixel for satisfying B (maximum brightness value) and R=G=0 as the conditions of compensation of CM exists. If such pixel exists, then the process proceeds to step S30 to convert the C=M values of the pixel in the RAM 205 into the maximum value and make Y=K=0, and then the process proceeds to step S31. If it is determined in step S29 that the conditions of compensation of CM are not satisfied, then the process proceeds to step S31.

Next, in step S31, the setting of "compensation of MY" is examined, and if the setting is "ON", then the process proceeds to step S33, if the setting is "Automatic", then the process proceeds to step S32, and if the setting is "OFF", then the process proceeds to step S35 (FIG. 9). In step S32, it is determined whether or not "compensation of MY" is set as the default setting, and if it is not set as the default setting, then the process proceeds to step S35. If "compensation of MY" is set as the default setting is step S32, the process proceeds to step S33 to determine whether or not a pixel for satisfying R=(maximum brightness value) and B=G=0 as the conditions of "compensation of MY" exists. If such pixel exists, the process proceeds to step S34 to convert the M=Y values of the pixel in the RAM 205 to the maximum value and make C=K=0, and then the process proceeds to step S35 (FIG. 9). If it is determined in step S33 that the conditions of "compensation of MY" are not satisfied, the process proceeds to step S35.

Finally, for the compensation of CY, in step S35 the setting of "compensation of CY" is examined, and if the setting is "ON", then the process proceeds to step S37, if the setting is "Automatic", then the process proceeds to step S36, and if the setting is "OFF", then the process ends. In step S36, it is determined whether or not "compensation of CY" is set as the default setting, and if it is not set as the default setting the process ends. If "compensation of CY" is set as the default setting in step S36, the process proceeds to step S37 to determine whether or not a pixel for satisfying C=(maximum brightness value) and R=B=0 as the conditions of "compensation of CY" exists. If such pixel exists, the process proceeds to step S38 to convert the C=Y values of the pixel in the RAM 205 into the maximum value and make M=K=0, and then end the processing. If it is determined in step S37 that the conditions of "compensation of CY" are not satisfied, the process ends.

As above described, according to the first embodiment, upon converting from RGB into colors of coloring materials used by a printing apparatus, for example, MCYK, it is possible to print by specifying the method for converting into the color of each coloring material used by the printing apparatus in accordance with the object being a printing subject.

Second Embodiment

In the above first embodiment, although input data is represented in a RGB color space, the color space may be a CMYK color space. The user interface to enable compensation settings to be made for each object in this case can be the same way in the aforementioned FIG. 5. The configuration of the printer according to the second embodiment is the same as that of the first embodiment, and therefore a description thereof is omitted here.

Figure 10:
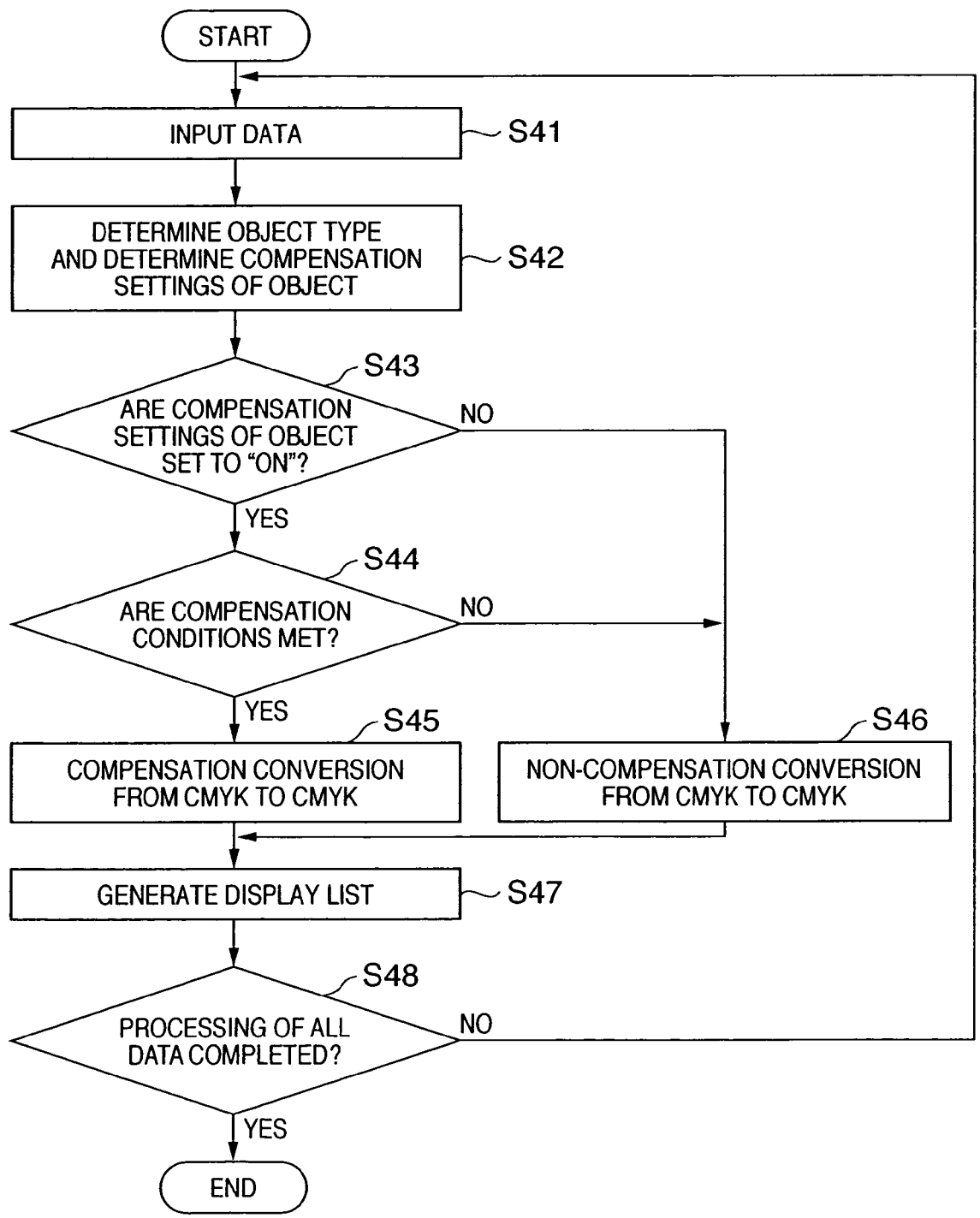
FIG. 10 is a flowchart for describing the processing of a printer controller of a second embodiment of this invention.

FIG. 10 is a flowchart that illustrates the processing of a printer controller 101 according to the second embodiment of this invention. A program for implementing this processing is stored in the ROM 219.

Drawing commands are input in step S41, then the process proceeds to step S42 to determine the type of object (character, graphic or image) included in the drawing commands. Next, in step S43, the type of object detected in step S42 and the compensation settings for each type of object (FIG. 5) are compared. The compensation settings in this case are received through a job ticket in accordance with settings made using the user interface of the host computer 201. Here, it is determined in step S43 that the setting for the object type is "compensation settings=ON", then the process proceeds to step S44, and otherwise the process proceeds to step S46.

In step S44, the pixel values of the drawing command are determined, and it is determined whether or not the pixel values meet with the conditions set in the compensation settings. If it is determined that the conditions set in the compensation settings are met, the process is advanced to step S45 to convert CMYK pixel values into the compensation value.

In step S45, the CMYK pixel values are converted to the compensation value and the process proceeds to step S47. In contrast, in step S46, the CMYK pixel values are converted into non-compensation values (CMYK), and then the process proceeds to step S47. In step S47, the converted data is stored in the intermediate buffer 209 as a display list. In step S48, it is determined whether the processing of drawing commands for one page has been completed. If the processing has been completed, then the processing ends and the generated display list is sent to the renderer 210. If the processing has not been completed in step S48, then the process returns to step S41.

In this case, the renderer 210 generates bitmap image data of the CMYK color space. For the non-compensation conversion of step S46, the color matching method is designated in advance in the object units, and the matching method may be switched by switching the look-up table in accordance with the type of object to be converted from CMYK into CMYK. For example, matching methods established by the ICC (International Color Consortium) can be applied as this switching method, and these methods are as follows:

Perceptual
Colorimetric
Saturation

Further, in a case where the conditions and compensation conditions in step S44 match, the conversion method is as follows.

Compensation of K: if C=M=Y, then convert to K only
Compensation of C: if M=Y=K=0, then convert to C
Compensation of M: if C=Y=K=0, then convert to M
Compensation of Y: if C=M=K=0, then convert to Y
Compensation of CM: if C=M=maximum density value ("255" in the case of 8 bits per pixel) and Y=K=0, then no color conversion
Compensation of MY: if M=Y=255 and C=K=0, then no color conversion
Compensation of CY: if C=Y=255 and M=K=0, then no color conversion By setting the compensation settings as described above, it is possible to perform the compensation of a single color, even in a case where the color for compensation is C, M or Y of a device.

Further, the compensation of a secondary color (representation of a color using only two coloring materials of a device) is also enabled. The compensation of color conversion processing from CMYK in step S45 can basically be implemented in the same manner as in the flowcharts (FIG. 7 to FIG. 9) of the first embodiment as described above, and a description thereof is omitted here.

Other Embodiments

The objects of this invention can also be achieved by supplying a recording medium on which the program code of software for implementing the functions of the foregoing embodiments is recorded, to a system or apparatus, to allow a computer (or CPU or MPU) of the system or apparatus to read the program code stored in the recording medium and implement the program code. In this case, the program code itself that was read from the recording medium implements the functions of the foregoing embodiments, and the recording medium on which the program code is recorded comprises this invention. Examples of a recording medium that can be used for supplying the program code include a floppy disk (registered trademark), a hard disk, an optical disk, a magneto-optical disk, a CD-ROM, a CD-R, DVD, a magnetic tape, a non-volatile memory card and a ROM.

Further, besides the case where the aforesaid functions according to the embodiments are implemented by executing the read program code by computer, an OS (operating system) or the like running on the computer may perform all or a part of the actual processing based on the instructions of the program code so that the functions of the foregoing embodiments can be implemented by this processing.

Furthermore, after the program code read from the recording medium is written to a function expansion board inserted into the computer or to a memory provided in a function expansion unit connected to the computer, a CPU or the like mounted on the function expansion board or function expansion unit may perform all or a part of the actual processing based on the instructions of the program code so that the functions of the foregoing embodiments can be implemented by this processing.

The present invention is not limited to the above embodiments, and various changes and modifications can be made thereto within the spirit and scope of the present invention. Therefore, to apprise the public of the scope of the present invention, the following claims are made.

CLAIM PRIORITY

The application claims priority from Japanese Patent Application No. 2004-173005 filed on Jun. 10, 2004, which is hereby incorporated by reference herein.

What is claimed is:

1. An image processing apparatus for inputting drawing commands of an RGB color space and converting into image data of a YMCK color space of coloring materials used by a printing apparatus, the apparatus comprising:

a first conversion unit configured to perform a non-compensation conversion of drawing data of the drawing commands of the RGB color space, wherein the non-compensation conversion converts the drawing data of the drawing commands of the RGB color space into a pixel value of image data of the YMCK color space, corresponding to the drawing data, wherein the drawing commands include character, image and graphic objects;

a second conversion unit configured to perform a compensation conversion of the drawing data of the RGB color space, wherein the compensation conversion converts the drawing data of the drawing commands of the RGB color space into a predetermined value including a single color or two colors of the YMCK color space in accordance with a color of the drawing data of the character, image and graphic objects of the RGB color space; and a user interface unit configured to display setting windows, respectively, corresponding to the character, image and graphic objects together on a display screen, wherein each setting window includes a first item to set whether or not to cause the second conversion unit to perform a single color compensation for converting the drawing data of a corresponding object of the RGB color space into a single color of the YMCK color space, and a second item to set whether or not to cause the second conversion unit to perform a secondary color compensation for converting the drawing data of the corresponding object of the RGB color space into two colors of the YMCK color space, wherein the first and second items are adjacently displayed on the display screen, the first item includes settings of compensations of K, C, M and Y for converting the drawing data of the corresponding object of the RGB into K, C. M and Y signals, respectively, and the second item includes settings of compensations of CM, MY and CY for converting the drawing data of the corresponding object of the RGB into C and M signals, M and Y signals, and Y and C signals, respectively.

2. An image processing method of inputting drawing commands of an RGB color space to covert into image data of a YMCK color space of coloring materials used by a printing apparatus, the method comprising:

a first conversion step of performing a non-compensation conversion of drawing data of the drawing commands of the RGB color space, wherein the non-compensation conversion converts the drawing data of the drawing commands of the RGB color space into a pixel value of image data of the YMCK color space, corresponding to the drawing data, wherein the drawing commands include character, image and graphic objects;

a second conversion step of performing a compensation conversion of the drawing data of the RGB color space, wherein the compensation conversion converts the drawing data of the drawing commands of the RGB color space into a predetermined value including a single color or two colors of the YMCK color space in accordance with a color of the drawing data of the character, image and graphic objects of the RGB color space; and a displaying step of displaying setting windows, respectively, corresponding to the character, image and graphic objects together on a display screen, wherein each setting window includes a first item to set whether or not to cause the second conversion step to perform a single color compensation for converting the drawing data of a corresponding object of the RGB color space into a single color of the YMCK color space, and a second item to set whether or not to cause the second conversion step to perform a secondary color compensation for converting the drawing data of the corresponding object of the RGB color space into two colors of the YMCK color space, wherein the first and second items are adjacently displayed on the display screen, the first item includes settings of compensations of K, C, M and Y for converting the drawing data of the corresponding object of the RGB into K, C, M and Y signals., respectively, and the second item includes settings of compensations of CM, MY and CY for converting the drawing data of the corresponding object of the RGB into C and M signals, M and Y signals, and Y and C signals, respectively.

* * * * *